United States Patent Office 3,120,556
Patented Feb. 4, 1964

3,120,556
HALOPHENYL CHLOROFORMATE DERIVATIVES
Joseph W. Baker, Kirkwood, and Raymond E. Stenseth, Webster Groves, Mo., assignors to Monsanto Chemical Company, St. Louis, Mo., a corporation of Delaware
No Drawing. Filed May 18, 1962, Ser. No. 195,984
7 Claims. (Cl. 260—463)

This invention relates to a novel class of halophenyl chloroformate derivatives. More particularly, this invention is concerned with a class of new organic compounds which are alkynyl halophenyl carbonates. Such carbonates are found to possess useful and unexpected biological activity.

The novel compounds of this invention have the general formula

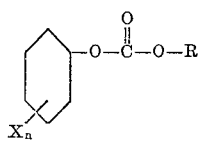

where X is selected from a group consisting of chlorine and bromine, $n$ is an integer from 3 to 5, and R is selected from a group consisting of propynyl and butynyl.

This class of compounds can be prepared by causing a halophenyl chloroformate to react with a selected alkynyl alcohol to produce the desired acetylenic carbonate. In each of these preparations, it is preferred to add a tertiary amine to the reaction mixture. Such an amine serves as an acceptor for hydrogen chloride which forms during the reaction. Examples of tertiary amines which can be used are quinaldine, triethylamine, dimethylaniline, diethylaniline, pyridine, and the like. The reactions employing an amine acceptor are shown in the following equations:

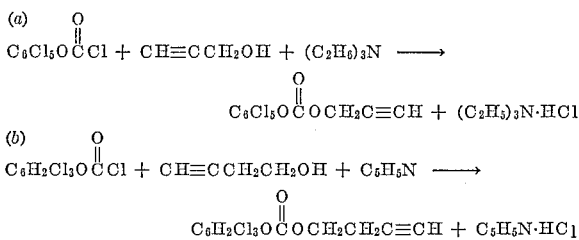

In practicing the preparations of the illustrated Reactions $a$ or $b$, it is also preferred to use an inert organic solvent for the chloroformate. Among the suitable solvents are benzene, toluene, xylene, hexane, heptane, octane, propyl ether, ethyl ether, tetrahydrofuran, dioxane, and the like. The reaction temperatures employed in preparing the new compounds will depend upon the particular reactants and, in general, will be between room temperature and the reflux temperature of the system.

It should be noted that although both are preferred, neither the tertiary amine nor the inert organic solvent are essential to the preparation of the compounds of this invention. In absence of such an amine, the hydrogen chloride which forms during the reaction can be boiled off.

The invention will be more fully understood by reference to the following examples which are set forth herein solely for the purpose of illustration and are not to be construed as limiting the scope of the present invention.

Example I

A suitable reaction vessel is charged with 16.4 grams (0.05 mole) of pentachlorophenyl chloroformate dissolved in 150 ml. Skellysolve C (an essentially n-heptane solvent having a boiling range of 86° C. to 100° C.) and 2.8 grams (0.05 mole) of 2-propynyl alcohol dissolved in 75 ml. benzene. The solution is stirred, and 5.1 grams (0.05 mole) of triethylamine in 25 ml. toluene is added dropwise over a period of about 25 minutes. The temperature rises from about 20° to 33° C. during the addition of the amine, and the mixture is then further stirred and refluxed for 6 hours. The reaction mixture is cooled, and the amine hydrochloride which forms is filtered off and washed with benzene. The benzene is removed from the combined washings and filtrate leaving a tan solid. Recrystallization from methylcyclohexane with activated charcoal yields 8.9 grams of pentachlorophenyl 2-propynyl carbonate as white crystals, and using Fisher-Johns melting point apparatus shows a M.P. 107–108° C. Analysis shows 51.2% chlorine, as against a calculated value of 50.9% for $C_{10}H_3Cl_5O_3$.

Example II

In a suitable reaction vessel, 13.0 grams (0.05 mole) of 2,4,5-trichlorophenyl chloroformate is reacted with 2.8 grams (0.05 mole) of 2-propynyl alcohol according to the procedure set forth in Example I. There is obtained 2-propynyl 2,4,5-trichlorophenyl carbonate in good yield.

Example III

In a suitable reaction vessel, 19.7 grams (0.05 mole) of 2,4,6-tribromophenyl chloroformate is reacted with 3.5 grams (0.05 mole) of 2-butynyl alcohol according to the procedure set forth in Example I. There is obtained 2-butynyl 2,4,6-tribromophenyl carbonate in good yield.

Example IV

In a suitable reaction vessel, 15.4 grams (0.05 mole) of 2,3,4,6-tetrachlorophenyl chloroformate is reacted with 2.8 grams (0.05 mole) of 2-propynyl alcohol according to the procedure set forth in Example I. There is obtained 2-propynyl 2,3,4,6-tetrachlorophenyl carbonate in good yield.

Example V

In a suitable reaction vessel, 27.6 grams of pentabromophenyl chloroformate is reacted with 3.5 grams of 2-butynyl alcohol according to the procedure set forth in Example I. There is obtained 1-butynyl pentabromophenyl carbonate in good yield.

The products of the present invention are useful as microbiocides adapted to be employed for the control of bacterial and fungal organisms. In a representative test, pentachlorophenyl 2-propynyl carbonate is active against *Staphylococcus aureus* at a dilution of one part per 100,000 and against *Aspergillus niger* at a dilution of one part per 10,000.

While this invention has been described with respect to certain specific embodiments, it is not so limited. It is to be understood that variations and modifications thereof may be made without departing from the spirit and scope of this invention.

The embodiments of the invention in which can exclusive property or privilege is claimed are defined as follows:

1. A compound of the formula

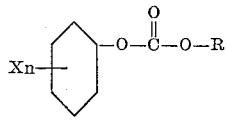

where X is selected from a group consisting of chlorine and bromine, $n$ is an integer from 3 to 5, and R is selected from a group consisting of propynyl and butynyl.

2. A compound of the formula

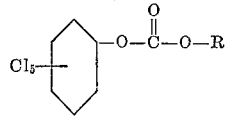

where R is propynyl.

3. A compound of the formula
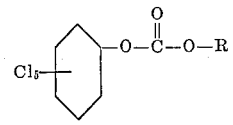
where R is butynyl.
4. A compound of the formula
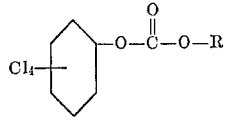
where R is propynyl.
5. A compound of the formula
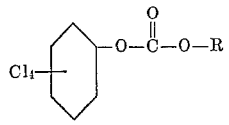
where R is butynyl.
6. A compound of the formula
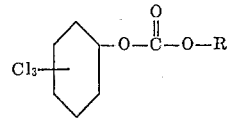
where R is propynyl.
7. A compound of the formula
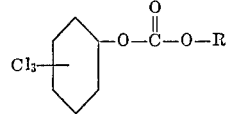
where R is butynyl.
References Cited in the file of this patent
UNITED STATES PATENTS
| | | |
|---|---|---|
| 2,548,141 | Bralley | Apr. 10, 1951 |
| 2,906,614 | Hopkins et al. | Sept. 29, 1959 |